US008832664B2

(12) United States Patent
Richter et al.

(10) Patent No.: US 8,832,664 B2
(45) Date of Patent: Sep. 9, 2014

(54) METHOD AND APPARATUS FOR INTERCONNECT TRACING AND MONITORING IN A SYSTEM ON CHIP

(75) Inventors: Andre Oliver Richter, Munich (DE); Helmut Reinig, Isen (DE); Vladimir Todorov, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 74 days.

(21) Appl. No.: 13/554,039

(22) Filed: Jul. 20, 2012

(65) Prior Publication Data

US 2014/0026126 A1 Jan. 23, 2014

(51) Int. Cl.
*G06F 9/44* (2006.01)

(52) U.S. Cl.
USPC ............................ 717/128; 717/127; 717/129

(58) Field of Classification Search
USPC .................................................. 717/124–130
IPC ............... G06F 11/36,11/364, 11/348, 11/3636, G06F 11/3664, 11/3668, 11/362
See application file for complete search history.

(56) References Cited

U.S. PATENT DOCUMENTS

| | | | |
|---|---|---|---|
| 5,321,828 A * | 6/1994 | Phillips et al. | 703/28 |
| 5,819,093 A * | 10/1998 | Davidson et al. | 717/126 |
| 6,748,583 B2 * | 6/2004 | Aizenbud-Reshef et al. | 717/127 |
| 7,055,136 B2 * | 5/2006 | Dzoba et al. | 717/125 |
| 7,058,928 B2 * | 6/2006 | Wygodny et al. | 717/128 |
| 7,386,839 B1 * | 6/2008 | Golender et al. | 717/131 |
| 7,721,263 B2 * | 5/2010 | Swoboda | 717/124 |
| 7,797,685 B2 * | 9/2010 | Agarwala et al. | 717/128 |
| 7,886,271 B2 * | 2/2011 | Agarwala et al. | 717/124 |
| 7,926,025 B2 * | 4/2011 | Campbell et al. | 717/104 |
| 8,312,435 B2 * | 11/2012 | Wygodny et al. | 717/130 |
| 8,429,617 B2 * | 4/2013 | Demetriou et al. | 717/124 |
| 8,504,994 B2 * | 8/2013 | Golender et al. | 717/128 |
| 8,522,209 B2 * | 8/2013 | Wintergerst et al. | 717/124 |

OTHER PUBLICATIONS

Schmittler et al, "Realtime Ray Tracing of Dynamic Scenes on an FPGA Chip", ACM, pp. 95-106, 2004.*
Berg et al, "Tracing Software Product Line Variability—From Problem to Solution Space" ACM Proceedings of SAICSIT, pp. 182-191, 2005.*
Gracioli et al, "Tracing Interrupts in Embedded Software", ACM pp. 137-146, 2009.*
Joye et al, "Traitor Tracing Schemes for Protected Software Implementations", ACM pp. 15-21, 2011.*
Aeroflex Gaisler, GRLIP IP Core User's Manual, Version 1.1.0-B4108, Jun. 2011, pp. 1-908.
ARM Limited, AMBA AHB Trace Macrocell (HTM), Technical Reference Manual, Revision: r0p4, Apr. 18, 2008, pp. 1-198.
First Silicon Solutions, Technical Data for AMBA Navigator, obtained from http://www.fs2.comlpdfs/NAV-AMBA.pdf on Jul. 23, 2012, pp. 1-2.

(Continued)

*Primary Examiner* — Anil Khatri

(57) ABSTRACT

Apparatuses and methods relate to tracing exchanges of a plurality of signals, including requests and responses, made between a master device and a slave device of the system on chip. The apparatuses and methods further relate to tracking the number of requests and the number of responses made before and after tracing is activated for determining which responses to trace after tracing is activated and for determining which remaining number of responses to trace after tracing is deactivated.

15 Claims, 12 Drawing Sheets

(56) References Cited

OTHER PUBLICATIONS

First Silicon Solutions, Preliminary Technical Data for OCP Navigator, obtained from http://www.fs2.com/pdfs/NAV-OCP_int.pdf, obtained from http://www.fs2.com/pdfs/NAV-OCP_int.pdf on Jul. 23, 2012, pp. 1-2.

Gharehbaghi et al., On-Chip Transaction Level Debug Support for System-on-Chips, SoC Design Conference (ISOCC), Nov. 22-24, 2009, pp. 124-127.

Yang et al., An On-Chip AHB Bus Tracer With Real-Time Compression and Dynamic Multiresolution Supports for SoC, IEEE Transactions on Very Large Integration (VLSI) Systems,vol. 19, No. 4, Apr. 2011, pp. 571-584.

* cited by examiner

METHOD AND APPARATUS FOR INTERCONNECT TRACING AND MONITORING IN A SYSTEM ON CHIP

TECHNICAL FIELD

Aspects of this disclosure relate generally to interconnect tracing. In particular, an aspect of this disclosure relates to improving high-performance System-on-Chip interconnect tracing.

BACKGROUND

A trace monitor helps embedded software developers to debug software that has been written for a system on chip (SoC). A SoC is an integrated circuit that incorporates typical computer components, such as central processing units (CPUs), graphic processing units (GPUs) and memory controllers in a single silicon die. These components communicate with each other over on-chip interconnects. For embedded software developers, it might be helpful to observe the software-caused communications as they propagate through the interconnects. This may provide information, such as transferred data words between CPU and memory, which can be used for debugging.

The process of capturing signal values for later observation is called tracing and the captured data is called the trace-data. The entity performing the observations is usually described as a trace monitor. Depending on the type of interconnects, trace monitors may hook up to either a bus or to one or more ports of a crossbar switch.

A trace monitor should never become an active member of the interconnects. It should always stay invisible for other components in order to comply with the paradigm of non-intrusive tracing. In a multitude of scenarios, the interplay of the different parties on the bus may be the cause of a bug. To take a single example, two components may be engaged in a race condition, because both want to interact with the same memory location at the same time. Altering these race conditions, e.g. due to a trace monitor that utilizes the same bus to transmit its trace data, may cause the bug to disappear.

Generally, SoC protocols are distinguishable from one another by vendor and their intended use-case and performance. Some of the most sophisticated and widespread interconnect protocols are: the ARM AMBA (Advanced Microcontroller Bus Architecture) protocol family; the IBM Core Connect protocol family; and the Open Core Protocol (OCP).

Many solutions employ IDLE cycle filtering as a trace-size reduction technique. If a trace solution offers advanced trace-size reduction techniques, such as signal compression and abstraction, it is only available for the AHB protocol. Unfortunately, AHB is considered only a mid-performance protocol, which disqualifies these solutions for use in high-performance SoCs that use faster protocols. On the other hand, if a solution supports high-performance protocols, it offers only IDLE cycle filtering and no further, advanced trace-size reduction techniques.

Therefore, it would be advantageous to have a method, system, and computer program product that addresses one or more of the issues discussed above.

SUMMARY

A method of tracing in a system on chip is provided. The method comprising; tracing an exchange of a plurality of signals between a master device and a slave device of the system on chip, wherein the plurality of signals have a number of requests and a number of responses; and tracking the number of requests and the number of responses made before and after tracing is activated to determine which Reponses of the number of responses to trace after tracing is activated and a remaining number of responses to trace after tracing is deactivated.

An apparatus is provided. The apparatus includes a trace monitor configured to trace an exchange of a plurality of signals between a master device and a slave device of the system on chip, wherein the plurality of signals have a number of requests and a number of responses; and track the number of requests and the number of responses made before and after tracing is activated to determine which Reponses of the number of responses to trace after tracing is activated and a remaining number of responses to trace after tracing is deactivated.

Logic encoded in one or more non-transitory computer readable media is provided that includes code for execution and when executed by a processor is operable to perform operations comprising: tracing an exchange of a plurality of signals between a master device and a slave device of the system on chip, wherein the plurality of signals have a number of requests and a number of responses; and tracking the number of requests and the number of responses made before and after tracing is activated to determine which Reponses of the number of responses to trace after tracing is activated and a remaining number of responses to trace after tracing is deactivated.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Some FIGURES may use similar reference numbers. This is merely to indicate that the same number in different FIGURES may be similar types of items. However, the same number in different FIGURES may be each its own iteration or aspect of this disclosure.

Figure 1:
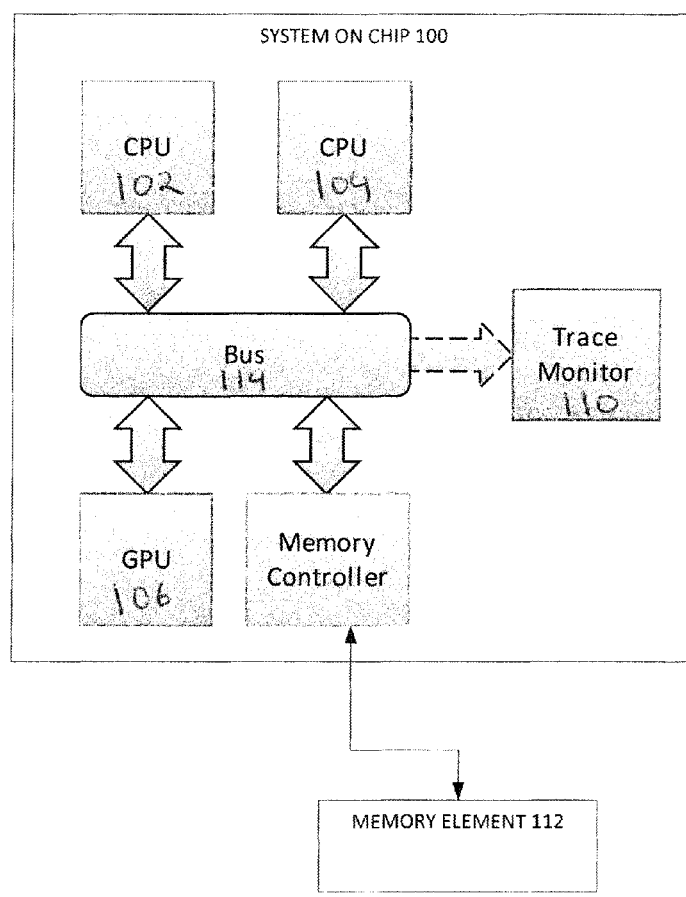
FIG. 1 is an illustration of a system on chip in accordance with an aspect of this disclosure.

FIG. 1 is an illustration of a system on chip in accordance with an aspect of this disclosure. System on chip (SoC) 100 may be an integrated circuit that incorporates typical computer components, such as central processing units (CPUs) 102 and 104, graphic processing units (GPUs) 106 and memory controllers 108 in a single silicon die. These components communicate with each other over on-chip interconnects.

SoC 100 may also include trace monitor 110. Trace monitor 110 may collect, manage, and analyze trace data. The various aspects of this disclosure recognize and take into account that many solutions employ IDLE cycle filtering as a trace-size reduction technique. If a trace solution offers advanced trace-size reduction techniques, such as signal compression and abstraction, it is only available for the AHB protocol. Unfortunately, AHB is considered only a mid-performance protocol nowadays, which disqualifies these solutions for use in high-performance SoCs that use faster protocols. On the other hand, if a solution supports high-performance protocols, it offers only IDLE cycle filtering and no further, advanced trace-size reduction techniques.

The various aspects of this disclosure recognize a need for a trace monitor for a high-performance protocol that offers advanced trace-size reduction techniques besides IDLE cycle filtering. The various aspects of this disclosure provide a design for such a trace monitor. The monitor has been developed for an OCP-implementation that is similar to the AXI protocol. The trace monitor disclosed herein can be considered high-performance. Instead of employing signal compression or abstraction techniques, this monitor implements advanced trace-size reduction by introducing on-the-fly, user-adjustable transaction-filtering. Whole transactions (request+response) can be filtered out during a trace. Transactions that shall be excluded can be classified through a range of filters. Such filters may describe allowed memory address ranges or allowed burst-lengths of transactions. In case a transaction does not comply with these rules, it is filtered out. These filters can be configured before every trace-round.

If not circumvented by on-chip logic, it has to be done manually before every trace round. To do so, all masters may be halted, e.g. by setting breakpoints for CPUs. After a short time, all outstanding responses will have finished. Only is it possible to start a trace where the first response will belong to the first request. However, this approach makes tracing complicated. In addition, it breaks with the paradigm of non-intrusive tracing (because it alters the environment that is observed). Trace monitor 110 may automatically drop responses that belong to requests that have been issued before tracing started.

Additionally, SoC 100 may include one or more memory elements (e.g., memory element 112) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein.

Furthermore, the operations for tracing in a SoC 100 herein may be implemented by logic encoded in one or more tangible media, which may be inclusive of non-transitory media (e.g., embedded logic provided in an application specific integrated circuit (ASIC), digital signal processor (DSP) instructions, software potentially inclusive of object code and source code to be executed by a processor or other similar machine, etc.). In some of these instances, one or more memory elements (e.g., memory element 50) can store data used for the operations described herein. This includes the memory elements being able to store software, logic, code, or processor instructions that are executed to carry out the activities described herein.

Processing units 102 and 104 may be a processor, multi-core processor, single core process, micro controller, controller circuit, or any other type of processing device. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

SoC 100 may include a bus system 114 which may be comprised of one or more buses, such as a system bus or an input/output bus. Of course, the bus system 114 may be implemented using any suitable type of architecture that provides for a transfer of data between different components or devices attached to the bus system 114.

The illustration of SoC 100 in FIG. 1 is not meant to imply physical or architectural limitations to the manner in which an aspect of this disclosure may be implemented. Other components in addition and/or in place of the ones illustrated may be used. Some components may be unnecessary in an aspect of this disclosure.

The protocol is partitioned into three phases, which is OCP terminology for pipelining/signal decoupling. For each phase, the master and slave perform a separate handshake.

Every transaction comes decoupled (request+write- or read-data) and with a ThreadID. Consecutive transactions with the same ThreadID may be completed in-order, but transactions with different ThreadIDs may be completed outof-order. This feature is used to increase the throughput of the bus. Under certain circumstances, a slave is able to respond faster if it reorders the sequence of received requests.

In OCP protocol there are two kinds of IDs: transaction ID and ThreadID. Each could be used to drive the ThreadID input of the trace monitor, or even a concatenation of both, if OCP uses both kinds of IDs. And protocols like AXI may work with a transaction ID per initiator plus a unique ID per initiator. A trace monitor attached to an interconnect that has multiple such initiators multiplexed together may use the concatenation of initiator ID and transaction ID on its ThreadID inputs to be able to deal with all independent request/response streams. A ThreadID may be used as an identifier of independently reordered sequences of requests and responses, regardless how this ThreadID is constructed in the end from the different IDs that may be available in interconnect protocols.

Figure 2:
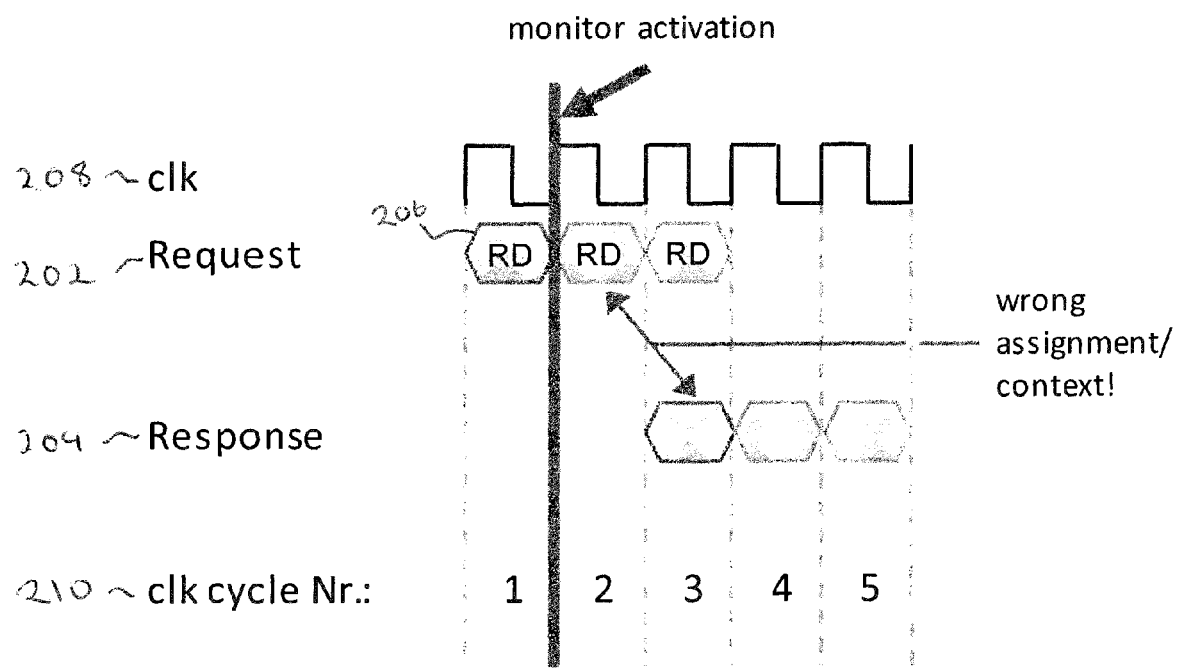
FIG. 2 is an illustration of an incorrect assignment in accordance with an aspect of this disclosure.

FIG. 2 is an illustration of an incorrect assignment in accordance with an aspect of this disclosure.

A trace monitor may incorporate on-chip logic, which solves a problem that emerges when a protocol utilizes pipelining with support for multiple outstanding transactions. This is a performance-increasing feature that is incorporated by all high-performance protocols. It allows requests 202 to be decoupled from the transmission of the corresponding response 204. Hence, a master may propose a new request even before the response to the preceding request has arrived. So it does not have to stay idle if the response of slave is delayed, which boosts the interconnect utilization. However, this feature can cause a so called loss-of-context. This happens when tracing is activated at an arbitrary point in time.

In this FIGURE, Clk 208 is the clock and clk cycle nr 210 is the clock cycle number for the purposes of the illustration. Starting in clock cycle 1, three consecutive read-requests 206 are issued. The decoupled responses start arriving in clock cycle 3, one after another for the respective requests. A loss of context happens, if the monitor is activated at an arbitrary point in time, at which the interconnect has been in operation already. The trace monitor may be activated after clock cycle 1. Therefore, it will record a read-request in clock cycle 2 and see a response in clock cycle 3. But these two do not belong together. In fact, the response belongs to the request that has been issued before the trace-monitor has been activated. But the monitor is missing that context. Consequently, it cannot drop the response from clock cycle 3. Therefore, looking at the trace-data output may lead to the delusion that the read-data from clock cycle 3 has been read from the location requested in clock cycle 2. This leads to an erroneous picture of the inner state of the SoC.

If it is not granted that the respective pipelined stages of a protocol are in the right context, all the information the monitor delivers may not be as valuable.

A slave utilizes reordering because it can use caching to quickly respond to all requests that want to read from the same address at once.

However, this loss of determinism makes it difficult to filter out a complete transaction, because it is unpredictable when a response to a request will be issued.

The protocol itself is based on bursts, which means that single-write and single-read transactions are handled like bursts of length one. Therefore, it is valid that a response for a single read/write-request is called the first or last beat, because it is the same at the same time. During the rest of this work, both names may be used according to what sounds more logical in the respective context. However, it is important to know that technically, they are always handled as being the last beat.

Figure 3:
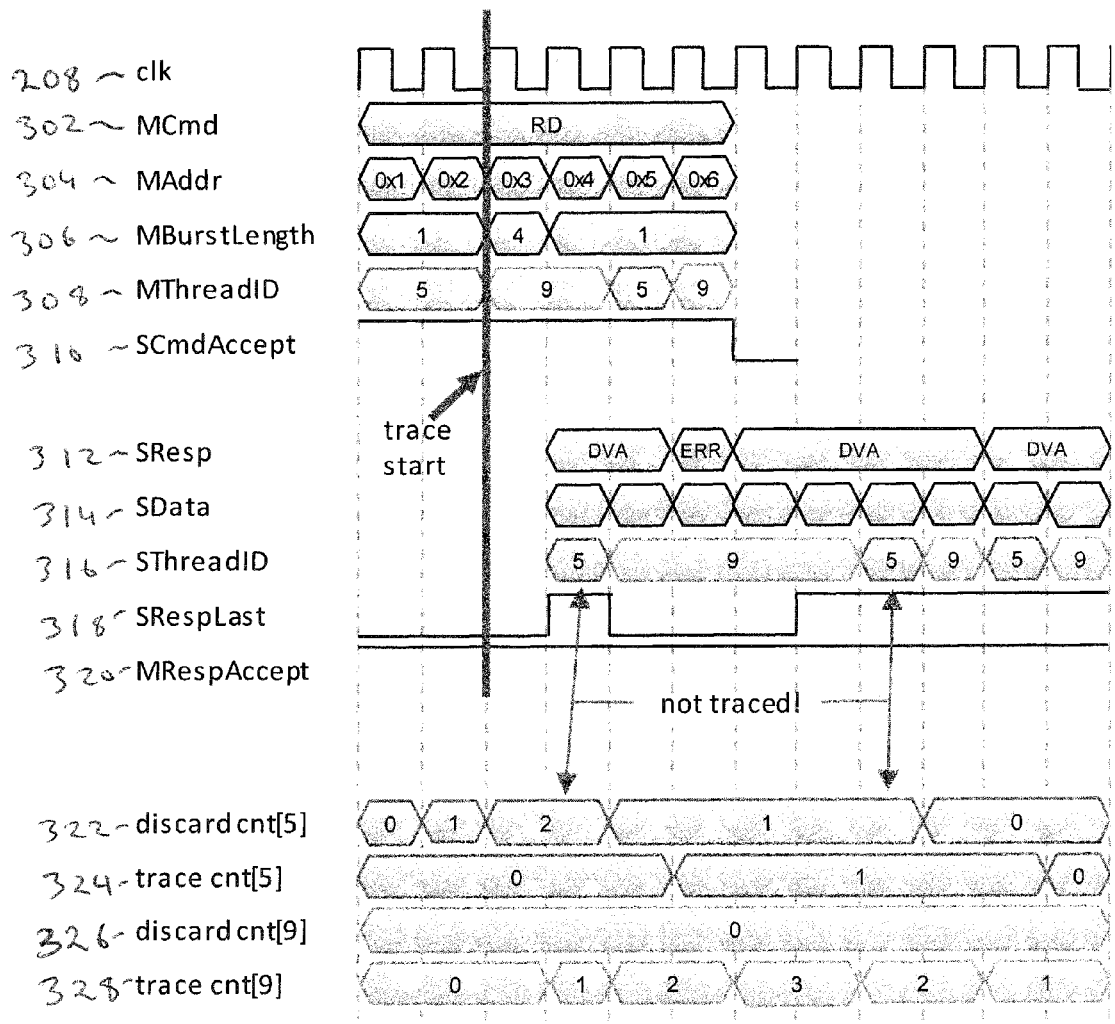
FIG. 3 is an illustration of context-awareness and user-adjustable transaction filtering in accordance with an aspect of this disclosure.

FIG. 3 is an illustration of context-awareness and user-adjustable transaction filtering in accordance with an aspect of this disclosure.

One or more aspects of this disclosure cover the approaches towards making the trace monitor context-aware and capable of transaction filtering. To keep it simple, all upcoming examples will feature only the Request and Response Phases. However, all concepts are directly applicable to the Data Handshake Phase as well.

Request Phase:

In the Request Phase, transactions are initiated. A master is allowed to use multiple ThreadiDs for its transactions, as long as they do not overlap with ThreadIDs of other masters. An issued request is kept on the bus until the slave is ready and acknowledges the request. This handshake concludes the Request Phase. The signals are:

MCmd 302: encodes eight states, but only IDLE, WRITE and READ are supported. The remaining encodings will be ignored and internally treated as if they were IDLE. If MCmd switches from IDLE to READ or WRITE, all other signals with a preceding "M" in their name have to be valid as well.

MAddr 304 encodes the target address for the respective operation.

MBurstPrecise and MBurstSingleReq both are tied to logical "1" permanently. This ensures that every burst transaction is a single-request burst.

MBurstSeq, like MCmd, has eight encodings, but only two are supported: NCR for increasing-burst type and WRAP for wrapping-burst type. The latter may only be used with power-of-two burst-lengths. If the start address is unaligned, it wraps around the address border of MBurstLength 306× MAddr'length/8.

MByteEn encodes a partial word transfer for a READ request. It has no meaning for a WRITE request. The signal has to be of length [(data_word_length/8)−1:0]. Thus, for every byte, MByteEn holds one bit. Each bit encodes whether a byte of the word shall be transferred or not.

MReqInfo holds user-defined, extra information that is sent with every request. MThreadID 308 is defined by the master for every request, as has been described above. SCmdAccept 310, finally, acknowledges the issued request of the master.

Therefore, MCmd and SCmdAccept form the handshake of the Request Phase. The possibilities of how the handshake may be performed:

1. SCmdAccept was asserted before the master issued the request. Thus, the request is accepted in the same clock cycle.

2. MCmd changes from IDLE to WRITE or READ while SCmdAccept is not asserted. a) If the slave is of low-latency, combinatorial type, it may assert SCmdAccept still in the same clock cycle.

b) In general, SCmdAccept will be asserted one or more clock cycles later for sequential type slaves.

Data Handshake Phase

The second of the three phases in the hierarchy is the Data Handshake Phase. Whenever a WRITE request has been submitted in the Request Phase, the actual write-data is delivered in this phase.

The master is allowed to present the first beat of a burst together with the request in the same clock cycle, but it is not necessary. Depending on its implementation, a slave may accept the write request and the write-data together in one clock cycle, but may do so in consecutive cycles as well. The signals may be as follows:

MDataValid and SDataAccept form the handshake. Like in the Request Phase, it is possible to have SDataAccept asserted before MDataValid goes high. If read-data for a burst-write is transmitted, SDataAccept has to acknowledge every single beat separately.

MData, MDataByteen and MDataInfo behave exactly like their corresponding signals in the Request Phase and are valid per beat.

MDataThreadID has to correspond to the actual ThreadID of the request that is being answered.

MDataLast indicates the last beat of a burst-transaction, and therefore concludes each write-data transfer.

Response Phase

The third phase in the hierarchy is the Response Phase. The signals may be as follows:

MRespAccept and SResp perform a handshake on two given scenarios:

Acknowledging a write transaction: This is done by driving SResp 312 to DVA (Data Accept) or ERR. This may happen in the same clock cycle or a clock cycle after the last beat has been asserted and acknowledged in the Data Handshake Phase.

Delivering beats of read-requests: For every beat delivered, SResp is driven to either DVA (Data Valid) or ERR. On the last beat, SRespLast 318 is driven to logical "1".

In all cases, the master informs the slave that it has processed the response by driving MRespAccept 320 high.

SData 314, SDataInfo and SDataThreadID 316 are, like in the two other phases, valid per beat.

IDLE cycles can be dropped by triggering the trace-logic only when a handshake is performed. This is the case whenever the statements in Table 1 evaluate as true.

TABLE 1

Handshake conditions

| Phase | Signals |
|---|---|
| Request | ((MCmd = WRITE) $\lor$ (MCmd = READ)) $\land$ (SCmdAccept = "1") |
| Data Handshake | (MDataValid = "1") $\land$ (SDataAccept = "1") |
| Response | (Sresp = NULL) $\land$ (MRespAccept = "1") |

By employing these triggering conditions, the trace-logic of each phase is automatically focusing solely on cycles in which data is actually transferred.

Context-Awareness Counters:

In order to prevent a loss of context, it may be necessary to drop all responses that belong to requests, which have been issued before tracing has been activated. This process is a primitive form of transaction filtering.

An aspect of this disclosure provides a system to eliminate the random behavior of the Response Phase by focusing on different threads independently, because within a single thread, the sequence of responses to requests is always in-order.

Therefore, the first approach towards making the monitor context-aware was based on implementing one discard counter and one trace counter for every ThreadID, such as discard cnt[5] 322, trace cnt[5] 324, discard cnt[9] 326, and trace cnt[9] 328. The counters are incremented and decremented according to the instructions in Table 2.

TABLE 2

Counter management

| | Discard Counter | Trace counter |
|---|---|---|
| Increment | Request issued && !(response issued) && Tracing offline | Tracing Online |
| Decrement | Response issued && !(request issued) && ((Trace online && discard counter > 0) \|\| (Trace offline && trace counter == 0)) | ((Trace online && discard counter == 0) \|\| (Trace offline && trace counter > 0)) |

For every ThreadID, the trace-logic gains knowledge about two things from the respective pair of counters:

First, when tracing is activated, the value of the discard counter indicates how many requests have been counted, whose responses have not yet been issued. Hence, the monitor knows how many of the soon-to-be-issued responses need to be dropped in order to restore the context.

Second, when tracing is deactivated, the trace counter indicates how many upcoming responses have still to be traced. This is because the trace counter counts how many requests, that have been issued while tracing was online, have not yet been responded.

An important requirement for these counters to work is that they are not turned on or off. They are live when the SoC comes out of reset and they only stop when the SoC is shut down. The monitor can only stay context-aware if it has observed the complete history of transactions on the bus. This is an implicit requirement.

In another aspect of this disclosure, after tracing has been activated, the monitor has to keep it active at least until all discard counters have become zero. If it is deactivated beforehand, the counters get mixed up and the trace-data gets mixed up too. This simple hysteresis can be implemented with little efforts.

Matching FIFOs for User-Adjustable Transaction Filtering:

The counter pairs for every ThreadID make the monitor context-aware. However, new problems emerge if user-adjustable filtering shall be employed in order to filter out whole transactions during a trace. FIG. 3 shows an example where three read-requests with ThreadID 9 are issued after the trace went online. Suppose a filter that is configured such that it should exclude all transactions that include address 0x4. Such a transaction is started by the second of the three requests with ThreadID 9. This is not a problem for the logic that observes and traces the Request Phase. The filter can tell the trace-logic to drop the current cycle as soon as it sees address 0x4 on the MAddr signal.

But dropping the corresponding response is much more difficult because it arrives in a later clock cycle, like shown in the example. Counters will not help here, because they would only be able to tell how many of the upcoming responses have to be dropped.

They cannot indicate which one of the three. What is needed in this case is an instance that memorizes every request separately, together with information whether the respective request has been traced or dropped. Once again, such an instance has to be employed for every ThreadID in order to circumvent the lacking determinism of out-of-order responses.

The approach to this problem was to implement a FIFO structure for every ThreadID. Whenever a request is issued, the FIFO for the respective ThreadID will be pushed a new entry, containing information whether the request has been traced or dropped. That means that the read signal of a FIFO indicates whether the upcoming response shall be traced or not. Of course, this is only true for the respective ThreadID each FIFO belongs to. The trace-logic can then act accordingly when it observes the response, and pop the FIFO on the last beat (SRespLast==1). Consequently, the read signal is switched to the next entry in the FIFO memory, which holds instructions for the next upcoming response.

The FIFOs that have been employed for this task also own a so-called bypass feature. If a new value is pushed to an empty FIFO, it is not only stored into the memory, but also propagates through the FIFO still in the same clock cycle. If there is also a read (pop) issued at the same time, the value will not even be stored into the memory. This is an important feature if the SoC has ultra-fast, combinatorial slaves. These slaves are able to respond to a request in the same clock cycle it is issued. This is, of course, only possible if there are no outstanding responses pending, which means that the corresponding FIFO has a fill count of zero at that moment. Given this scenario, the trace-logic will see a request, trace or drop it and push a new entry to the FIFO. Meanwhile, the slave already answered to the request. Still in the same clock cycle, the trace-logic observes the response and inspects the FIFO's output whether the corresponding request has been traced or not. Due to the bypass feature, the value has propagated through the FIFO and indeed belongs to the correct request. Hence, the trace-logic is able to perform the correct action for the response. Without the bypass feature, the value would not have been visible in the same clock cycle but one clock cycle later, causing the trace-logic for the Response Phase to act erroneously.

Additionally, the fill count of every FIFO is indicates how many outstanding responses are pending for the respective ThreadID.

Merging Both Solutions:

It turned out that Context-Awareness Counters are not needed when a design also employs matching FIFOs, because both approaches can be merged. The FIFOs borrow from the counters that they are live directly after the reset, not only when tracing is active. Thus, every time the trace-logic observes a request while tracing is offline, the respective FIFO is pushed with a drop instruction. Hence, tracing can be switched on at an arbitrary moment in time. The trace-logic then already knows, by looking at the FIFO elements, how many responses are to be dropped until requests and responses are in context again.

Filter Setup:

To make use of the matching FIFOs, the following selection of adjustable filters has been implemented:

Address range: Transactions are traced only if their address is inside or outside a given range.

Burst length: Transactions are traced only if their burst length is inside or outside a given range.

ThreadID range: Transactions are traced only if their ThreadID is inside or outside a given range.

Data range: Responses are traced only if their data word is inside or outside a given range.

Request type: It is possible to exclude write- or read-transactions.

Burst type: It is possible to exclude all burst-transactions, or only bursts of type NCR or WRAP.

All these filters may be configured before a trace is started.

The illustration of state management system in FIG. 3 is not meant to imply physical or architectural limitations to the manner in which an aspect of this disclosure may be implemented. Other components in addition and/or in place of the ones illustrated may be used. Some components may be unnecessary in an aspect of this disclosure. Also, the blocks are presented to illustrate some functional components. One or more of these blocks may be combined and/or divided into different blocks when implemented in an aspect of this disclosure.

Figure 4:
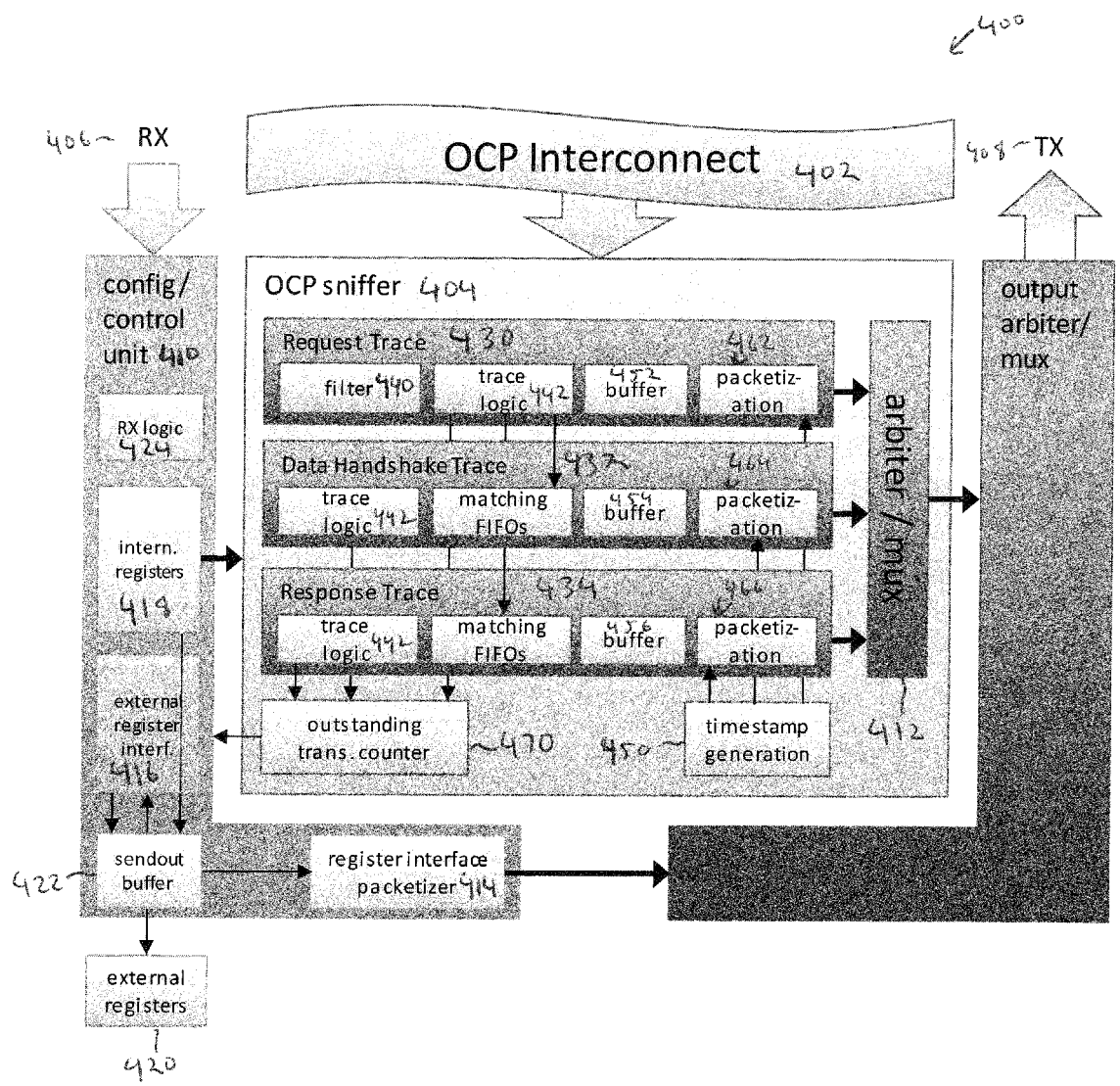
FIG. 4 is a block diagram of the hardware architecture of the trace monitor in accordance with an aspect of this disclosure.

FIG. 4 is a block diagram of the hardware architecture of the trace monitor in accordance with an aspect of this disclosure.

The trace monitor 400 has to be put into the same clock domain as the OCP signals it observes. RX 406 and TX 408 denote the input/output ports of the monitor. They may be directly pinned out or interconnected with an intermediate on-chip subsystem that, for example, stores the trace-data to on-chip RAM.

The OCP interconnect signals 402 that are subject to tracing are routed directly into the OCP sniffer block 404. All the signals are read-only inputs. The trace monitor can, in no way, alter any of the signals. It is completely invisible to the interconnect. This ensures completely non-intrusive observations.

Input and output operations are done via a Network-on-Chip interface. The monitor receives and sends packets. Packets are subdivided into flits, which are the atomic units of transfer. There are three kinds of flits:

Header flit

Payload flit

Tail flit

In an example, a header, body and tail flit are transmitted, respectively. The sender signals a valid flit by asserting the request signal. The receiver acknowledges its transmission with the ready signal. If the receiver is busy, ready is de-asserted. In that case, the sender has to hold the current flit until ready is asserted again.

RX and TX subsystems of the monitor are completely decoupled. The receive side is handled by the subsystem called config/control unit 410, which has sole access to the RX port. The transmission part, on the other hand, is not handled by a single unit. Every packetization block inside the monitor brings its own TX port interface. Who is allowed to use the latter is decided by going through two stages of arbitration and multiplexing.

The output arbiter/mux 412 is the highest order arbitration and multiplexing block. It directly connects to the TX port of the monitor. This block has to decide between the register interface packetizer 414 and the OCP sniffer 404. The one who wins arbitration gets his signals directly multiplexed to the TX port of the monitor.

But even before that happens, the arbitration and multiplexing stage inside OCP sniffer has to decide who is competing against the register interface block. What happens inside OCP sniffer and who is competing for arbitration in here will be explained shortly.

Configuration/Control Unit 410:

The configuration/control unit is the starting point for any monitor activities. It hosts all the configuration registers that control the monitor behavior.

There is a pair of registers for every filter that compares an OCP signal against a user-defined range. Their default values are set to cover the whole possible range of the respective signal. The configuration register holds the configuration of the filters and controls whether tracing is on or off.

Per default, the configuration register is configured such that tracing is offline, and no data-filtering and no statistical tracing is done. What that means will be explained shortly. Additionally, all types of requests are traced and all range filters drop a request when their value is outside the range that is stored in the respective registers.

The monitor also features an external register interface 416 linked to external registers 420 through a sendout buffer 422.

These external registers are optional. Depending on what they control, they could make the debugging process much more convenient. One example would be to interface to registers that control debug features of the CPU. Thus, it would be possible to set up the trace monitor and the debugging breakpoints of the CPU over the same interface.

As mentioned previously, the configuration/control unit interfaces to the RX port of the Monitor I/O interface and listens for incoming packets using RX logic 424. There are two types of packets that are accepted and processed:

Updates (new values/data words) for a certain register.
Read-requests for a certain register.

The registers are distinguished by unique addresses, internal and external ones alike.

Writing Registers:

Registers can be updated by sending a packet of write-type, containing register address and value, to the monitor. But writing new values to the internal registers 418 is not as trivial as it might look like in the first place. The data_max and data_min registers, for example, hold values that are used for filtering the data words in the Data Handshake and Response Phase. Changing these values during an active trace would affect the consistency of the trace output because of two reasons:

1. Data Handshake and/or Response Phases could be in the middle of tracing a burst. The new register values could cause beats to be filtered out that would have otherwise been traced.
2. The same applies to outstanding transactions, where the request has already been traced, but the respective Data Handshake or Response Phase data is still pending.

As a consequence, when receiving a packet with a register update, the state-machines first check if the monitor is currently active. If so, a shutdown of all current tracing activities is initiated by setting the status [0] bit to "0". This causes the Request Trace block inside OCP sniffer to immediately stop tracing any requests. Meanwhile, the ready signal of the RX port is de-asserted, thus putting the incoming packet on hold. The monitor remains in this state until all outstanding transactions of the Data Hand-shake and Response Phases are completed. The outstanding transactions counter indicates when this is the case.

It is a simple counter that is increased by two for every write-request and by one for every read-request that has been traced. If the outstanding transactions, belonging to the respective requests, are spotted in the Data Handshake (write-data) and/or Response (write acknowledge or read-data) Phase, the counter is decreased accordingly. As soon as it becomes zero, the monitor re-asserts the ready signal, processes the rest of the incoming packet and updates the respective register.

For every successful register update, the monitor will store an acknowledge packet, containing the address of the register that has been updated, inside the sendout buffer.

Reading Registers:

Reading registers faces no such difficulties like writing does. A read-type packet containing the register address is sent to the monitor. The register value is read out and stored into the sendout buffer.

Sending Packets:

The register interface packetizer will notice when the sendout buffer has been filled. An ID field inside the buffer will tell the packetizer if it is a response to a read request or an acknowledge to a write-request. It then requests arbitration from the output arbiter/muxer. When granted, the packet is assembled on-the-fly and sent out via the TX port.

Modularized OCP Sniffing:

After the monitor has been configured and activated through the internal registers, the OCP Sniffer block will proceed with tracing.

The trace-logic 442 has been partitioned into three logical subsystems, based on the three phases of the protocol. Consequently, there is a Request 430, Data Handshake 432 and Response tracing block 434. But only the Request Trace block may exist. The designers of the SoC may spare the other two blocks. One reason to do is to save area/gates when this resource is very limited. Omitting instantiations of the Data Handshake and/or Response blocks is possible via dedicated generics at the compile time. Each block 430, 432, 434 may include a buffer 452, 454, 456, respectively, and also perform packetization with the packetization blocks 462, 464, 466, respectively.

If both are spared, the outstanding transaction counter 470 and arbiter/mux instances will be automatically omitted too. Without the Data Hand-shake Trace and Response Trace instances, the Request Trace instance has nothing to compete with for arbitration. At the same time, there will not be any outstanding transactions, rendering the outstanding transactions counter useless.

Request Trace:

The Request Trace block is the root of all tracing activities, because it observes the OCP Phase that initiates every transaction. This block is able to produce five different packets containing trace-data. These are:

Data packets:
single WR
single RD
burst WR
burst RD
Statistics packet, delivering information about lost transactions.

The reason for distinguishing between four different data packets is that, depending on the type of transaction, some of the Request Phase signals are negligible. Excluding these signals in the first place helps to save precious bandwidth when the trace-data is transmitted to the outside world.

Statistics packets are generated whenever transactions could not have been traced due to a full trace buffer. There are four loss counters, one for each of the four basic transactions.

The monitor will filter out all IDLE cycles with filter 440. This means that the monitor will trace only clock cycles in which both handshake signals are "positive". Hence, they will not contribute any information. For that reason, SCmdAccept is not included in any of these trace packets. MCmd, however, has a dual purpose. It serves as both, a handshake signal and a request type (WR or RD) indicator. Together with the MBurstLength signal, MCmd can be used to determine the PacketID (single WR, single RD, and so on), which will be transmitted in the header (header-flit) of a trace-data packet. So the information MCmd holds is partially encoded in the header of the trace packet, but it is not traced in raw form and transmitted in the payload of the packet.

For single WR/RD requests, MBurstSeq is irrelevant. Likewise, MBurstLength is not needed when the packet header already tells that it is a single type transaction. It would be a waste of bandwidth to encode that information by sending out a seven bit digit that will always be one.

The MByteEn signal is only of interest for RD type requests. WR type requests deliver this kind of information in the Data Handshake Phase.

The Trace Buffer Design:

A simple FIFO acts as the buffer that stores the packet contents. The depth can be adjusted by a dedicated generic. An element in this FIFO is partitioned with PacketID, Payload, and TimeStamp.

The width of the element is determined by the packet whose payload aggregates the most data, which is the burst RD packet in this case. Since some of the signal widths are only determined at the compile time through generics (MReqInfo and MThreadID), the FIFOs element width also varies.

The only mandatory field is the PacketID, because it is needed by the packetzier in order to know what is stored inside the payload part of the trace-buffer. The timestamp 450 field is shown because it is the only one that is incorporated in all five packets. The rest of the trace-data is stuffed into the payload part. The packetizer will always start with inspecting the PacketID field. Afterwards, it will continue from the right to left.

Figure 5:
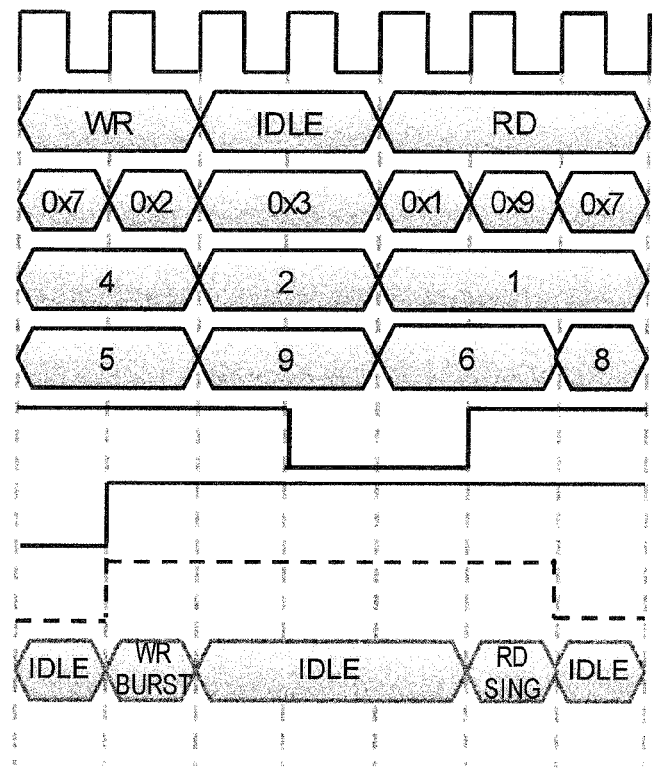
FIG. 5 is an illustration of a trace action signal in accordance with an aspect of this disclosure.

FIG. 5 is an illustration of a trace action signal in accordance with an aspect of this disclosure.

The first element in the tracing chain is a subsystem that continuously generates a signal called trace_action 502. This signal can encode five different states:

IDLE
WR_SINGLE
WR_BURST
RD_SINGLE

The filter signal 504 is depicted with a dashed line because it is not really a dedicated signal inside the trace-logic block. It has been put into this Figure for comprehension purposes. In reality, the filtering signal is implicitly generated and evaluated inside the logic block that generates the trace_action signal. In this example, the filter is configured to exclude transactions concerning address 0x7. The trace_active signal 506 indicates when the trace is active.

The Trace-Logic:

What comes afterwards is the actual tracing logic. It is connected to the write port of the trace buffer and solely observes the trace_action signal. Whenever this signal changes to a non-IDLE value, the trace-logic tries to write a signal dump, together with the correct PacketID (indicated by the trace_action signal) and a timestamp, into an empty element of the trace buffer. If the trace buffer is full, the respective loss counter is increased.

In case one of these loss counters has a value greater than zero, the trace logic waits for the next IDLE cycle of the trace_action signal. It then further evaluates, during the IDLE cycle, if at least two elements are free inside the trace buffer. If so, it pushes the contents of a statistics packet, aka the loss counters and a timestamp, into the FIFO. Otherwise, it backs off until two elements are free, even if that means that further losses have to be counted in the process. The reason for waiting for two free elements explains as follows:

If statistics data would be written into a trace buffer with only one free element, this data would block the trace buffer again, which could in turn trigger additional losses. So the next data that would be stored into the trace buffer would again be statistics data. To prevent that goes on forever, the logic waits for two free elements. This ensures that every statistics/loss data dump is followed by at least one trace-data dump.

Figure 6:
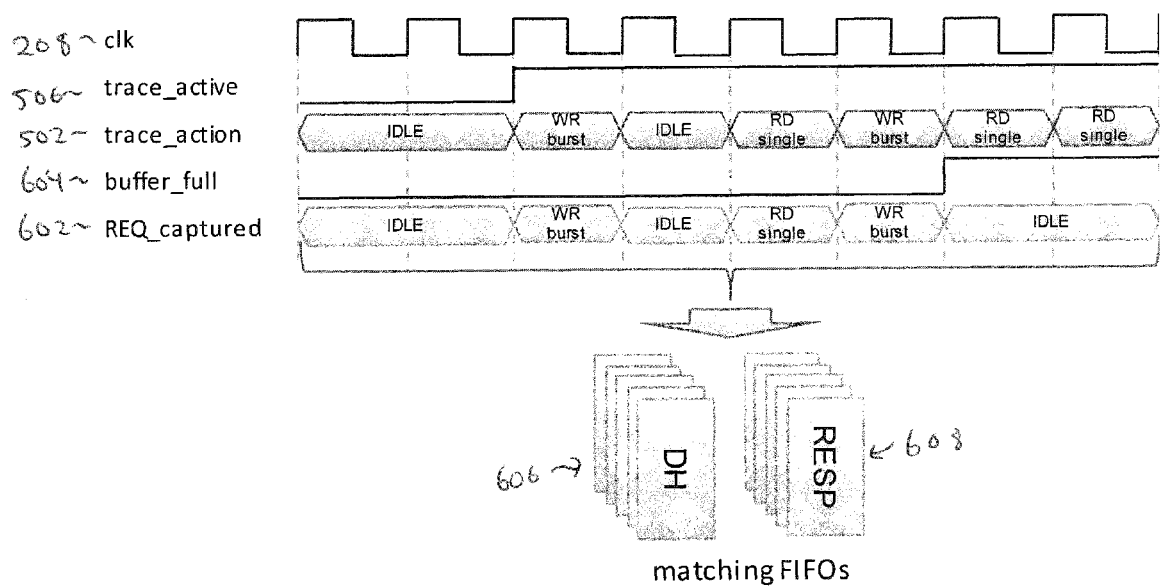
FIG. 6 is an illustration of a REQ captured signal in accordance with an aspect of this disclosure.

FIG. 6 is an illustration of a REQ captured signal in accordance with an aspect of this disclosure.

While pushing trace-data into the trace buffer, the trace-logic generates a signal called REQ_captured 602. It encodes the same four states like the trace_action signal, but its values have different semantics. In the context of the new signal, WR_SINGLE no longer means "there is a single write request happening right now". Instead, it indicates that "this single write request on the bus right now will be captured". This change in semantics applies to the other signal states accordingly. Consequently, the REQ_captured signal will have a non-IDLE value only when the trace buffer has an empty slot to store the current request. If the trace buffer is full, indicated by the buffer full signal 604, and the request cannot be traced, REQ_captured will stay IDLE.

The history of the REQ_captured signal, from SoC boot-up to shutdown, tells exactly which requests in the Request Phase have been traced4 and will show up when examining the trace-data output. This is exactly what is needed for the matching FIFOs. Depending on the ThreadID that is issued with a request, the matching FIFO belonging to that ThreadID will record the value of the REQ_captured signal.

So when a data transfer is issued in the Data Handshake 606 or Response Phase 608, all the trace-logic has to do is to look at the current output of the respective matching FIFO. It will tell whether this data transfer has to be traced or not.

The Packetizer:

However, before that happens, the packetizer of the Request Phase will proceed to action. It is completely decoupled from the other subsystems and connected only to the read port of the trace buffer. The packetizer is triggered when the trace buffer fill count is greater than zero. It will then inspect the PacketID field to determine what has to be packetized. Meanwhile, arbitration is requested from the Arbiter/Mux block inside OCP sniffer. Once through-connected to the TX port of the monitor, the packetizer will send out the packet, split up in its atomic flits. The arbitration may last as long as it takes to send out the whole packet.

Statistical Tracing:

The monitor also has a special tracing mode called statistical trace. It is activated through the config[10] bit of the configuration register.

Statistical tracing will not record any actual signals from the interconnect. Instead, the loss counters will be utilized to count how many single-write, single-read, burst-write and burst-read-requests that passed the filters are issued during the time the trace is active.

A statistics packet containing these four counters will then be sent on two occasions: When one of the counters is getting close to overflowing and/or when tracing is stopped.

In statistical tracing mode, the REQ_captured signal will always be assigned IDLE. Consequently, Data Handshake and Response trace-logic will not trace any data.

With statistical tracing mode, it is possible to get an estimate of the interconnect utilization.

Data Handshake Trace

In the Data Handshake Phase, write-data, belonging to a preceded request, is transferred from the master to the slave. Due to lack of a separate term for this whole process, it shall be called a write-response during the rest of this disclosure.

There are two big differences between the Data Handshake Phase and the Request Phase that influenced this signal partitioning.

First, data transfers may need more than one clock cycle to finish. This is the case when write-data for burst-write-requests is transferred on the interconnect. As the OCP implementation used for this work does not support write-data/response-data interleaving, all beats of a burst will occur in-order. In this case, it is not necessary to transmit the ThreadID for every consecutive beat; because they will certainly belong to the same ThreadID as the first beat that has been traced. This is why there is a separate packet for the first beat and one for every consecutive beat. The latter will come without the ThreadID. Additionally, each consecutive beat will occur only a few clock cycles after its predecessor, so the timestamp is spared as well.

There is also a new third-party signal: The beat number. This signal is generated by a counter and always holds a value with the number of the current beat. This number is included in both, the first beat packet and each of the consecutive beat packets. This information is hugely important for keeping the trace-data consistent. Two scenarios where this is needed read as follows:

1. Let the trace buffer be full when a transmission of burst-data starts. The monitor will be unable to trace the first few beats, but some slots in the trace buffer become free sometime in the middle of the transfer. So the first beat that will be traced is not the first beat of the whole transfer.

2. Assumed the trace buffer has one or more free slots when a burst transmission starts, but eventually reaches its limit during the burst. Some beats will have to be dropped, but still during the same transfer, the trace buffer is freed again, so that additional, later beats of the same transfer will again be traced.

In both cases, the monitor would miss some beats of a transfer. Without a beat number assigned to every one of those beats, it would be impossible to reconstruct which beat belongs to which memory address. This is why this counter has been implemented.

Second, loss counting cannot be approached in the same easy way as it has been done for the Request Phase. In the latter, it is sufficient to know that a request has been lost, but it is not of any importance to have further information about it, besides what the kind of the request has been. Additionally, in the further process, the matching FIFOs will make sure that the corresponding Data Handshake and/or Response Phase data will be filtered out too. However, the other way round, losing a write-response of a previously traced request, brings forth a new problem:

When reviewing the trace-data output after tracing, it is necessary to be able to exactly pinpoint to which request the lost write-response belonged. Otherwise, the correct sequence of requests and write-responses will not be reproducible.

However, write-responses may arrive out-of-order in the Data Handshake Phase. Therefore, it would make no sense to produce statistics packets that only state how many write-responses have been lost. It is necessary to know how many write-responses have been lost per ThreadID. For this thesis, the following approach to this problem has been chosen:

The monitor features an array of loss counters, one for every ThreadID. Whenever data of a write-response is dumped into the trace-buffer, the trace-logic will include the loss-counter value of the counter belonging to the same ThreadID that has been asserted with the write-response. Afterwards, the respective counter is reset to zero. So the combination of the "prey. Losses" and MDataThreadID values tell how many write-responses for a certain ThreadID have been lost before the current packet has been captured.

The loss counters will only increase if the whole write-response has been lost. If at least one beat has been dumped, the counters will remain unchanged. Therefore the consecutive beat packets will not feature the prey. Losses value, because they will only be generated when a proceeding beat has already been captured (in the form of a first-beat packet, containing the prey. Losses value).

Alternatively, a dedicated statistics packet containing all loss-counters for all ThreadIDs could be generated whenever the Data Handshake Phase is in a idle cycle. But depending on the number of ThreadIDs, this packet may become very big, so this approach has not been pursued.

Data-filtered packets are generated only when the user explicitly wants to perform a trace with data filtering. In order to do so, the config[9] bit may be set to "1" before tracing is activated. With this option activated, the trace-logic will check the MData value of every beat against the filtering rules (range values inside data_max and data_min registers and range policy set through the config[4] bit). When a data-filtered trace is performed, only packets of type data-filtered will be generated. The idea behind is, that data filtering is only activated when explicit information about an erroneous data word is available. So chances are high that only very few beats during the whole trace will need to be captured. To maximize chances that these beats will be caught, a second category of counters is introduced:

The discard-counters. There is, like with the loss counters, one for every ThreadID. Whenever a beat is observed whose MData value is outside the range of the filters, the respective discard-counter will be increased. The counter values will also be stored with every traced packet. These counters are necessary to keep the trace-data consistent, while minimizing the amount of beats that have to be dumped.

MDataValid and SDataAccept, being the handshake signals, are neglected for known reasons. MDataLast is not dumped either, because the information it encodes is more than covered with the beat Nr. signal.

Packets of single type, in contrast to a "first beat" type; do not include a beat number for obvious reasons.

The Trace Buffer Design:

The trace-buffers for the Data Handshake trace-logic have been split into two separate parts. The partitioning can be seen in Table 3.

Like in the Request Phase, a generic can be used to control the FIFO depths. But the generation rules differ between the two:

TABLE 3

Trace-buffer partitioning (a) first FIFO

| PacketID | MData | MDataByteEn | MDataInfo | beat Nr. |

(b) second FIFO

| discarded cnt. | prev. Losses | MDataThreadID | Timestamp | depthfirstFIFO=2generic+1
depthsecondFIFO=2generic

The idea behind this partitioning is that in most cases, a burst transaction will produce more consecutive beat packets than first beat packets (the only exception being a burst transaction of length two). Therefore, the first FIFO has been assembled such that it can store all values needed for a consecutive beat packet. As those packets will come in superior numbers, the first FIFO will always have more elements than the second FIFO. The latter is only used when additional data for non-consecutive beat packets needs to be stored. Thus, the gate count is minimized by preventing the instantiation of redundant FlipFlops, while the trace-yield remains the same.

Figure 7:
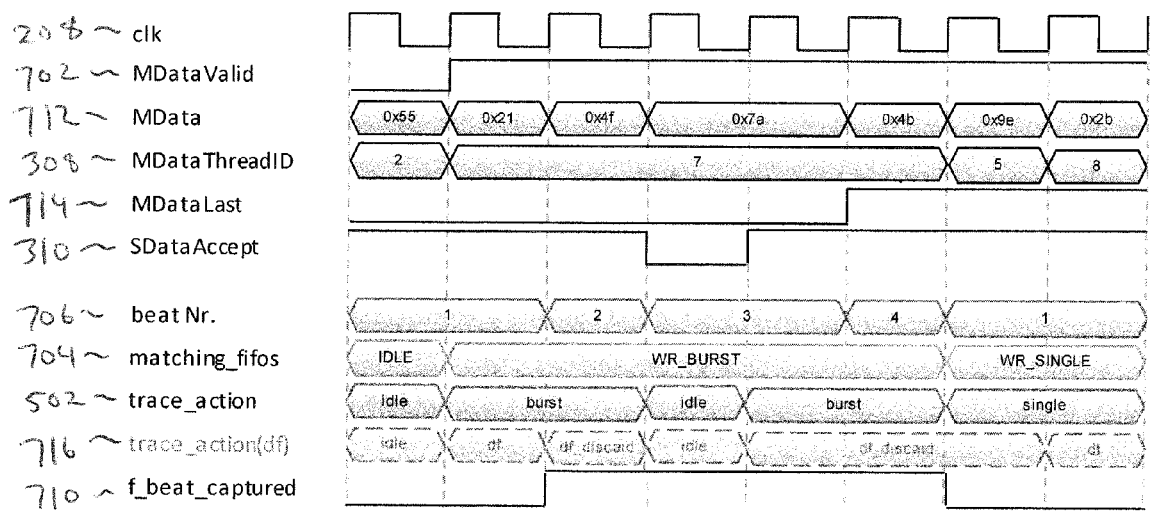
FIG. 7 is an illustration of a trace action signal in accordance with an aspect of this disclosure.

FIG. 7 is an illustration of a trace action signal in accordance with an aspect of this disclosure.

Tracing in the Data Handshake Phase starts with a trace_action signal 502, just the same as in the Request Phase. Depending on the trace mode (standard or data-filtering), the signal may take on the following encodings:

TABLE 4

Data Handshake Phase trace_action encodings

| encoding | standard | data-filtering |
|---|---|---|
| idle | x | x |
| single | x | |
| burst | x | |
| df5 | | x |
| df_discard | | x |

The logic generating this signal evaluates the following inputs on-the-fly:
1. The output of the matching FIFO 704 belonging to the MThreadID value currently asserted.
2. The MDataValid 702 and SDataAccept 310 signals (handshake).
3. The result of the data range check (only if data-filtering is activated).

The trace_action signal takes on a non-idle value only if the matching FIFO has a non-idle value on its output signal and the MDataValid and SDataAccept signals both are set logical "1". MData 712 includes the data. MDataLast 714 may be the last handshake. Also, trace_action(df) signal 716 indicates the tracing with the data filtering option.

If the user has activated data filtering, the results of the data range comparator are checked as well.

The Packetizer:

The packetizer works exactly like its Request Phase counterpart. The only difference is that it has to connect to two FIFOs instead of one. It is triggered every time the first FIFO is filled with at least one element. If the latter is of type consecutive beat, the packetizer has to access the first FIFO only. Otherwise, it has to assemble the packet by merging the outputs of both FIFOs.

Response Trace:

The Response Phase trace-logic generates the last bunch of trace-data packets.

A WR ack packet acknowledges whether a write-transaction (single or burst) has been finished successfully or with an error. Therefore, the only signals needed are SResp and SThreadID. A prev. Loss counter value is included too, because a write acknowledge response is equal to any other response within a certain ThreadID, and therefore may be the first packet that reports previously lost responses.

The trace buffer is split into two parts just like it is done for the Data Handshake Phase. Trace_action signal generation beat number 706 counting, first_beat_captured 710 signal and packetization units are also implemented in the same way.

OCP Sniffer Arbiter/Mux:

This block manages the arbitration and multiplexing of the tracing subsystems inside OCP Sniffer. A different arbitration and multiplexing block will be instantiated depending on which tracing subsystem will be instantiated6. There is one available for every combination:
Request+Data Handshake Phases
Request+Response Phases
Request+Data Handshake+Response Phases The policy has been chosen to be priority based only, featuring the following order:
1. Request Phase
2. Response Phase
3. Data Handshake Phase Requests are the most important part in the tracing chain. If they cannot be traced, the corresponding write-responses and responses will be ignored in the process too. Therefore, it is important to catch as many as possible. Thus, the Request Phase trace-buffers get the highest priority. Therefore, they will be freed first whenever the OCP Sniffer is granted access to the TX port, which in turn creates more space for tracing more requests.

Next in order is the Response tracing, because unlike the Data Handshake tracing, this Phase generates packets for write- and read-requests (write-acknowledge and read-data responses, respectively). Data Handshake tracing will generate trace-data for write-requests only. Consequently, in a scenario where write- and read-requests are evenly distributed, the Response Phase tracing subsystem will generate more packets than the Data Handshake tracing subsystem.

Output Arbiter/Mux:

Like its OCP Sniffer counterpart, this arbitration and multiplexing block is priority based. It has to decide between the OCP Sniffer and the register interface packetizer. The latter will be preferred, because it will generate only small packets (32 bit registers, register write acknowledge) on rare occasions (user may request them).

Additionally, during tracing, the OCP Sniffer will ask for arbitration with almost no interruption. Thus, it does not hurt to mix in a small register interface packet from time to time, instead of being blocked by the OCP Sniffer all the time.

The above sections deduced that every ThreadID need a separate matching FIFO. The one depicted above is designed to save and provide information for write-responses with ThreadID 1. To do so, the REQ_captured signal, for reasons mentioned above is connected to the write-input (wdata).

This input signal may be stored whenever a request with ThreadID 1 is issued in the Request Phase, which corresponds to a non-IDLE cycle with ThreadID 1 asserted. This is what the logic-block connected to the winc-signal evaluates. A comparator checks if MCmd equals WRITE, while a second comparator assures the operation is issued for the same ThreadID that belongs to the FIFO (ThreadID 1 in this case). Finally, an and-gate assures that the winc-signal is only triggered when both comparators evaluate as true and the slave accepts the request (SCmdAccept="1").

Triggering winc stores the current value asserted on the wdata input and increases the write pointer inside the FIFO. Afterwards, the FIFO has a fill count of 1 (assuming it was empty before), which means that a write-response for ThreadID 1 in the Data Handshake Phase is will be seen in the near future.

Once the corresponding write-response is arriving, the multiplexer will connect the rdata output to the matching_fifos signal. This is done by directly connecting the selection input of the multiplexer to the MDataThreadID signal. Thus, the matching_fifos signal will always be connected to the matching FIFO designated for the current ThreadID.

When the write-response finishes (transmission of the last beat takes place), the entry needs to be popped from the FIFO. This is done by the logic connected to the rinc signal. The 3-input and-gate checks if the final beat of a transaction is transferred (MDataValid=SDataAccept=MDataLast="1"). A comparator confirms that the transaction is performed for the correct ThreadID, while a second and-gate merges their outputs. The rinc signal then increases the read pointer inside the FIFO, which releases the current element.

The same concept, only slightly adapted, is used for the Response Phase matching:
FiFOs. The following changes have to be made:
winc logic checks for (MCmd=READ)
rinc logic checks for ((Sresp=NULL)∧(MRespAccept="1")∧(SRespLast="1"))

In order to prevent that the matching FIFOs may eventually overflow, the designer must ensure that the FIFO depths equal the maximum number of outstanding transactions. As this number may vary for different implementations of the same protocol, a dedicated generic can be adjusted to set the FIFO depths before compiling.

Additionally, like matching FIFOs, loss and discard counters have to be instantiated per thread in the Data Handshake and Response Phases. Here, too, multiplexing/demultiplexing instances, which are switched by the OCP ThreadID signals, can be used to manage the counters.

The trace-logic may indicate, independently from the current ThreadID, that the current transaction on the bus will be lost or discarded by asserting the incr_cnt signal. Mux/Demux units, switched by MDataThreadID or SThreadID, will then switch accordingly.

There may be scenarios where it is not necessary to have tracing support for every possible ThreadID. A SoC that needs 20 Threads, for example, has to have ThreadID signals of 5 bit width. Consequently, there are 12 ThreadIDs (25–20) that may never be used. In another scenario, the SoC designer may willingly want to exclude certain ThreadIDs from ever being traced. In these cases, it may be a waste of silicon space to instantiate a matching FIFO, a loss- and a discard-counter for every such ThreadID. Therefore, two generics will allow the designer to set a range of ThreadIDs that shall be supported by the trace monitor. All other ThreadIDs will be excluded from tracing. No matching FIFOs and counters will be instantiated for them in the first place.

The ThreadID range that is supported for tracing can afterwards still be narrowed by setting the ThreadID range-filter through the software interface.

The foregoing has outlined rather broadly the features and technical advantages of the different aspects of this disclosure in order for the detailed description that follows may be better understood. Additional features and advantages of the aspects of this disclosure will be described hereinafter. It should be appreciated by those skilled in the art that the conception and the specific aspects disclosed may be readily utilized as a basis for modifying or redesigning other structures or processes for carrying out the same purposes of the different aspects of this disclosure. It should also be realized by those skilled in the art that such equivalent constructions do not depart form the spirit and scope as set forth in the appended claims.

In different aspects of this disclosure, FIGS. 8-12 may be used in combination with each other.

Figure 8:
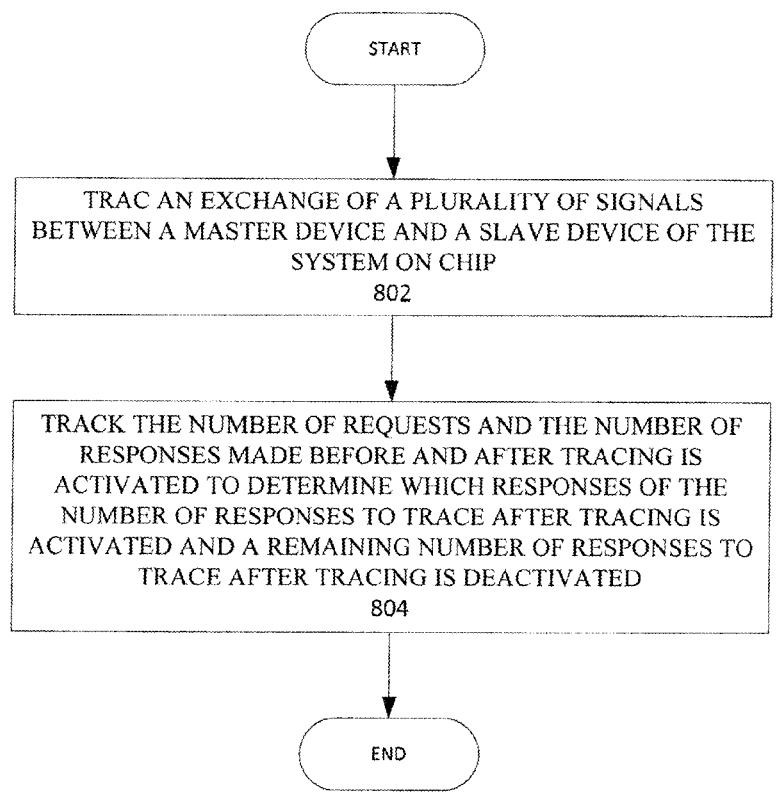
FIG. 8 is a flowchart for identifying network congestion in a system on chip in accordance with an aspect of this disclosure.

FIG. 8 is a flowchart for identifying network congestion in a system on chip in accordance with an aspect of this disclosure. Process 800 may be implemented in system on chip 100 from FIG. 1.

In an aspect of this disclosure, process 800 begins with tracing an exchange of a plurality of signals between a master device and a slave device of the system on chip (step 802). The plurality of signals have a number of requests and a number of responses determines whether the at least one packet delay time meets a threshold.

Then, the process tracks the number of requests and the number of responses made before and after tracing is activated to determine which responses of the number of responses to trace after tracing is activated and a remaining number of responses to trace after tracing is deactivated (step 804).

Figure 9:
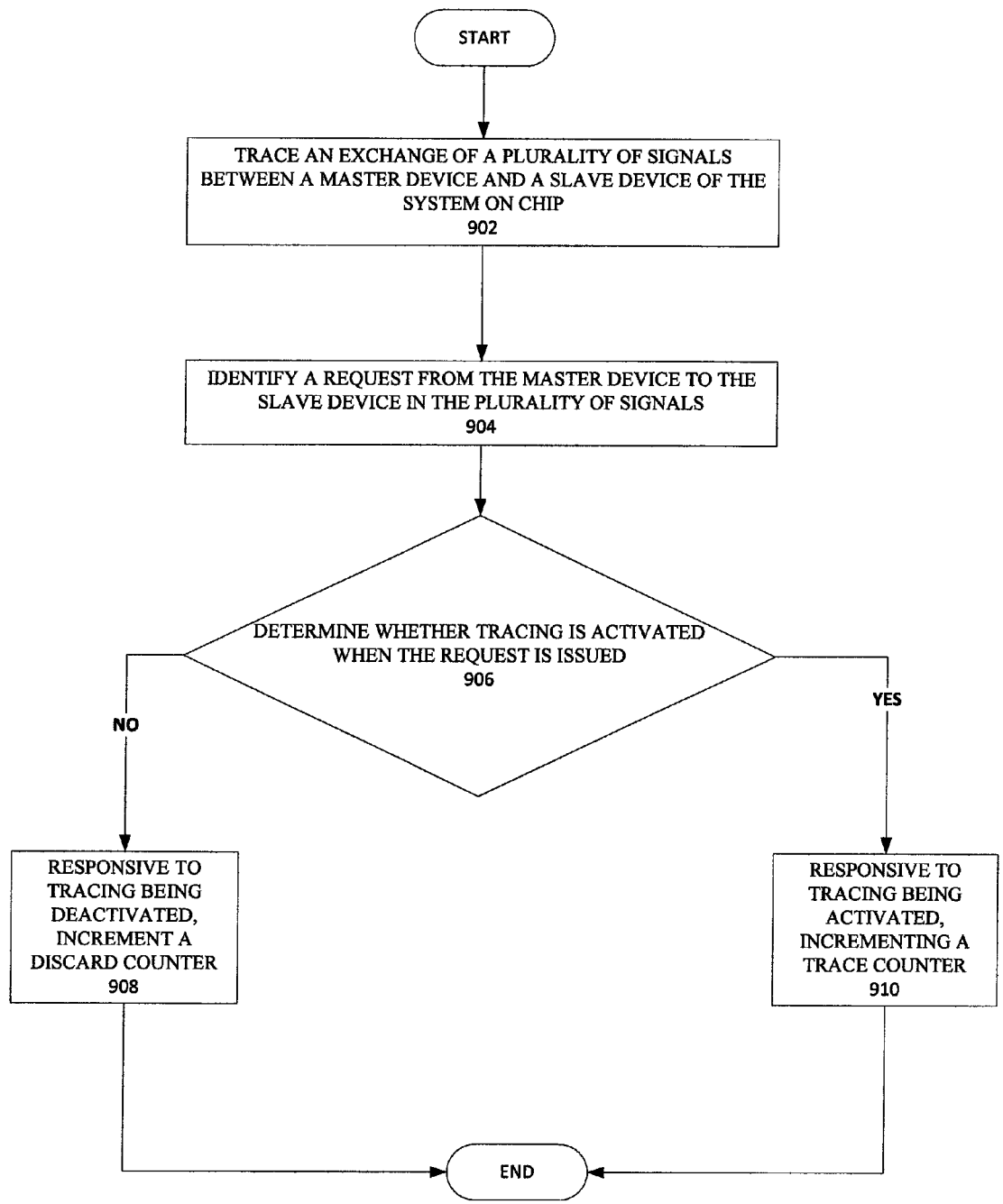
FIG. 9 is a flowchart for identifying network congestion in a system on chip with counters in accordance with an aspect of this disclosure.

FIG. 9 is a flowchart for identifying network congestion in a system on chip with counters in accordance with an aspect of this disclosure. Process 900 may be implemented in system on chip 100 from FIG. 1.

In an aspect of this disclosure, process 900 begins with tracing an exchange of a plurality of signals between a master device and a slave device of the system on chip (step 902). The plurality of signals have a number of requests and a number of responses determines whether the at least one packet delay time meets a threshold.

Then, the process identifies a request from the master device to the slave device in the plurality of signals (step 904). Next, the process determines whether tracing is activated when the request is issued (step 906). Responsive to tracing being deactivated, incrementing a discard counter (step 908). Responsive to tracing being activated, incrementing a trace counter (step 910). Thereafter, the process terminates.

Figure 10:
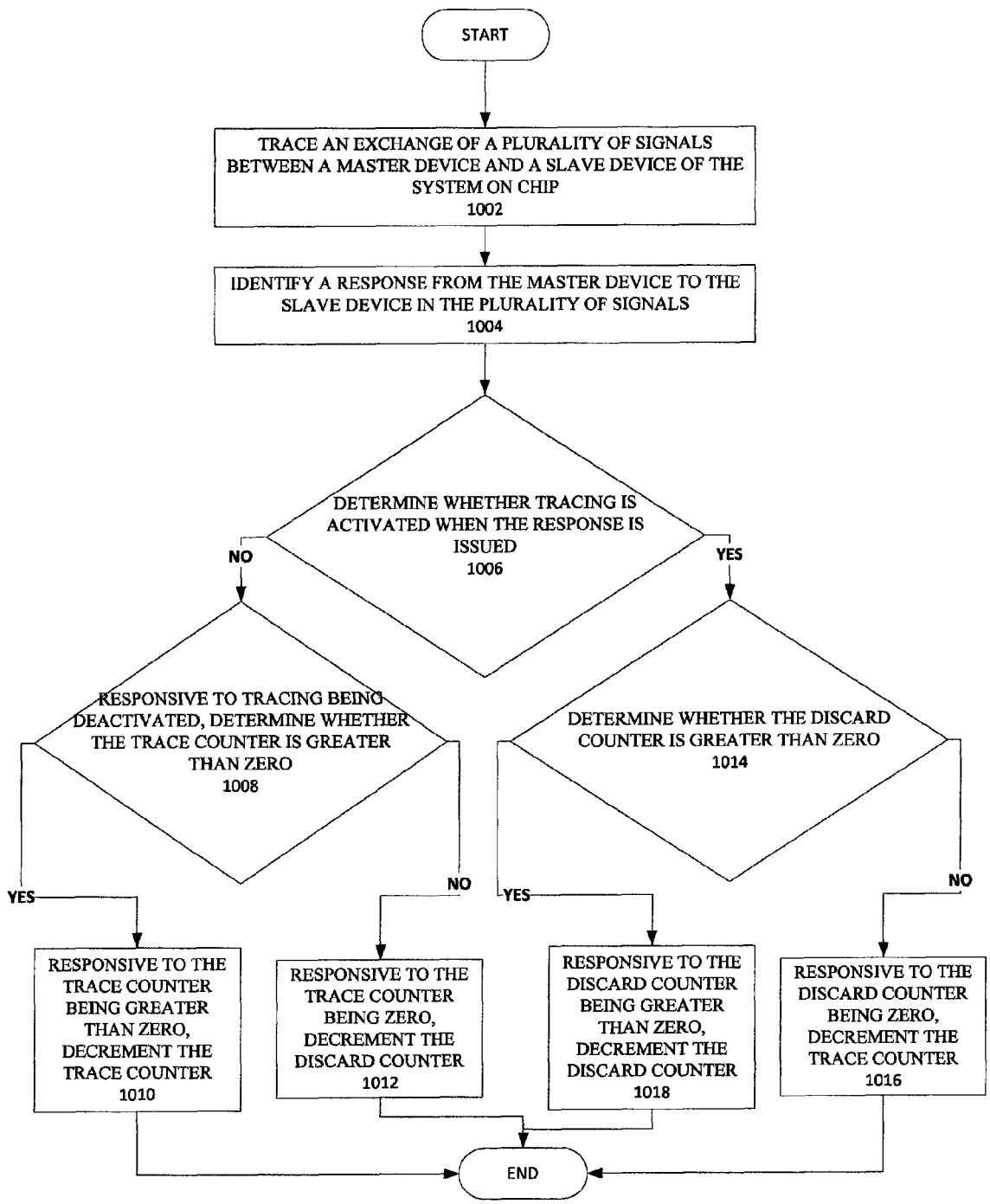
FIG. 10 is a flowchart for identifying network congestion in a system on chip with counters in accordance with an aspect of this disclosure.

FIG. 10 is a flowchart for identifying network congestion in a system on chip with counters in accordance with an aspect of this disclosure. Process 1000 may be implemented in system on chip 100 from FIG. 1.

In an aspect of this disclosure, process 1000 begins with tracing an exchange of a plurality of signals between a master device and a slave device of the system on chip (step 1002). The plurality of signals have a number of requests and a number of responses determines whether the at least one packet delay time meets a threshold.

Then, the process identifies a response from the master device to the slave device in the plurality of signals (step 1004). Next, the process determines whether tracing is activated when the response is issued (step 1006). Responsive to tracing being deactivated, determining whether the trace counter is greater than zero (step 1008). Responsive to the trace counter being greater than zero, decrementing the trace counter (step 1010). Responsive to the trace counter being zero, decrementing the discard counter (step 1012).

Back to step 1006, responsive to tracing being activated, determining whether the discard counter is greater than zero (step 1014). Responsive to the discard counter being zero, decrementing the trace counter (step 1016). Responsive to the discard counter being greater than zero, decrementing the discard counter (step 1018). Thereafter, the process terminates.

Figure 11:
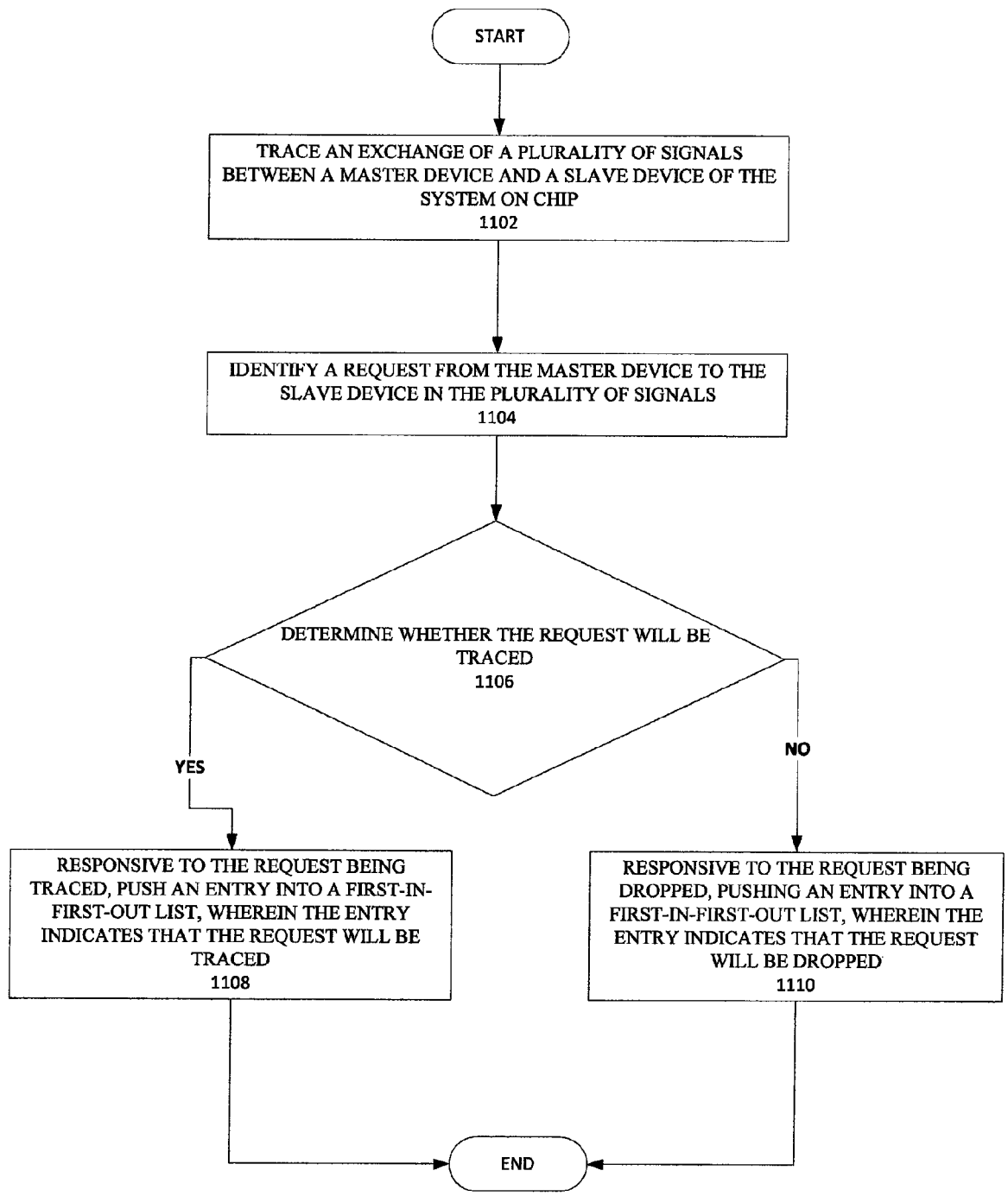
FIG. 11 is a flowchart for identifying network congestion in a system on chip with FIFO in accordance with an aspect of this disclosure.

FIG. 11 is a flowchart for identifying network congestion in a system on chip with FIFO in accordance with an aspect of this disclosure. Process 1100 may be implemented in system on chip 100 from FIG. 1.

In an aspect of this disclosure, process 1100 begins with tracing an exchange of a plurality of signals between a master device and a slave device of the system on chip (step 1102). The plurality of signals have a number of requests and a number of responses determines whether the at least one packet delay time meets a threshold.

Then, the process identifies a request from the master device to the slave device in the plurality of signals (step 1104). Next, the process determines whether the request will be traced (step 1106). Responsive to the request being traced, pushing an entry into a first-in-first-out list, wherein the entry indicates that the request will be traced (step 1108). Responsive to the request being dropped, pushing an entry into a first-in-first-out list, wherein the entry indicates that the request will be dropped (step 1110). Thereafter, the process terminates.

Figure 12:
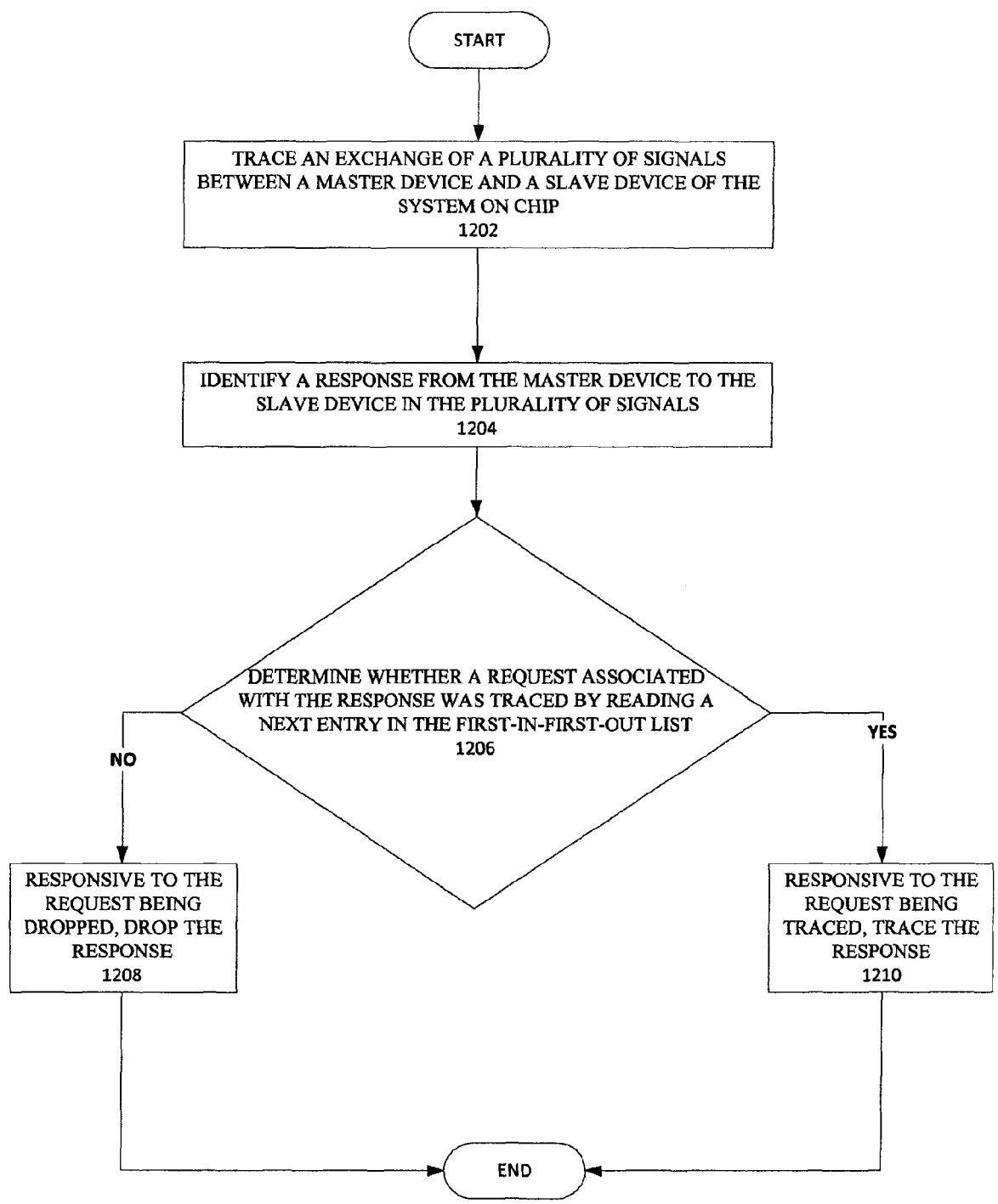
FIG. 12 is a flowchart for identifying network congestion in a system on chip with FIFO in accordance with an aspect of this disclosure.

FIG. 12 is a flowchart for identifying network congestion in a system on chip with FIFO in accordance with an aspect of this disclosure. Process 1200 may be implemented in system on chip 100 from FIG. 1.

In an aspect of this disclosure, process 1200 begins with tracing an exchange of a plurality of signals between a master device and a slave device of the system on chip (step 1202). The plurality of signals have a number of requests and a number of responses determines whether the at least one packet delay time meets a threshold.

Then, the process identifies a response from the master device to the slave device in the plurality of signals (step 1204). Next, the process determines whether a request associated with the response was traced by reading a next entry in the first-in-first-out list (step 1206). The next entry indicates whether the response is associated with the request that was traced. Then, responsive to the request being dropped, dropping the response (step 1208). Responsive to the request being traced, tracing the response (step 1210). Thereafter, the process terminates.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

A method for tracing, the method comprising; tracing an exchange of a plurality of signals between a master device and a slave device, wherein the plurality of signals have a number of requests and a number of responses; tracking the number of requests issued before tracing is activated which have not been issued a response; activating tracing; discarding a trace of the response to each of the number of requests issued before tracing is activated; tracking the number of requests issued after the tracing is activated; tracking the number of responses issued after the tracing is activated; deactivate tracing; and identifying the number of responses to be traced after tracing is deactivated.

What is claimed is:

1. A method of tracing in a system on chip comprising a trace monitor, the system on chip further comprising a master device and slave device exchanging a plurality of signals comprising a plurality of requests and a plurality of responses, the method comprising;
   tracing by the trace monitor comprising receiving and storing one or more requests and one or more responses from the plurality of requests and the plurality of responses; and
   tracking, by the trace monitor a set of one or more requests and a set of one or more responses made between the master device and the slave device before and after tracing is activated to determine which responses from the set of responses to trace after tracing is activated and which of the remaining responses from the set of responses to trace after tracing is deactivated, wherein for each request from the set of requests, the tracking comprises
       identifying the request from the master device to the slave device in the plurality of signals,
       determining whether tracing is activated when the request is issued,
       responsive to determining that tracing is deactivated, incrementing a discard counter; and responsive to determining that tracing is activated, incrementing a trace counter;
   wherein the set of requests and the set of responses have a first thread ID.

2. The method of claim 1, wherein for each response from the set of responses, the tracking comprises:
   identifying the response from the slave device to the master device in the plurality of signals;
   determining whether tracing is activated when the response is issued;
   responsive to determining that tracing is deactivated, determining whether the trace counter is greater than zero;
   responsive to determining that the trace counter being greater than zero, decrementing the trace counter;
   responsive to determining that the trace counter is zero, decrementing the discard counter;
   responsive to determining that tracing is activated, determining whether the discard counter is greater than zero;
   responsive to determining that the discard counter is zero, decrementing the trace counter; and
   responsive to determining that the discard counter is greater than zero, decrementing the discard counter.

3. The method of claim 1, wherein the plurality of signals further comprise a second set of requests and a second set of responses, and wherein the second set of requests and the second set of responses have a second thread ID, and wherein the method further comprises: tracking, by the trace monitor, the second set of requests and the second set of responses made before and after tracing is activated to determine which responses from the second set of responses to trace after tracing is activated and which of the a remaining responses from the second set of responses to trace after tracing is deactivated.

4. The method of claim 1, wherein for each request from the set of requests, the tracking further comprises:
   determining whether the request will be traced;
   responsive to the request being traced, pushing an entry into a first-in-first-out list, wherein the entry indicates that the request will be traced; and
   responsive to the request being dropped, pushing an entry into the first-in-first-out list, wherein the entry indicates that the request will be dropped.

5. The method of claim 4, wherein for each response from the set of responses, the tracking further comprises:
   identifying a response from the slave device to the master device in the plurality of signals;
   determining whether a request associated with the response was traced by reading a next entry in the first-in-first-out list, wherein the next entry indicates whether the response is associated with the request that was traced;
   responsive to determining that the request is dropped, dropping the response; and
   responsive to determining that the request is traced, tracing the response.

6. A system on chip comprising a trace monitor configured to:
   trace an exchange of a plurality of signals between a master device and a slave device of the system on chip, wherein the plurality of signals comprise one or more requests and one or more responses; and
   track a set of one or more requests and a set of one or more responses made between the master device and the slave device before and after tracing is activated to determine which responses from the set of responses to trace after tracing is activated and which of the remaining responses from the set of responses to trace after tracing is deactivated,
   wherein for each request from the set of requests, the trace monitor is further configured to identify the request from the master device to the slave device in the plurality of signals;
determine whether tracing is activated when the request is sent;
responsive to determining that tracing is deactivated, incrementing a discard counter; and
responsive to determining that tracing is activated, increment a trace counter;
wherein the set of requests and the set of responses have a first thread ID.

7. The trace monitor of claim 6, wherein for each response from the set of responses, the trace monitor is further configured to:
identify the response from the slave device to the master device in the plurality of signals;
determine whether tracing is activated when the response is issued;
responsive to determining that tracing is deactivated, determine whether the trace counter is greater than zero;
responsive to determining that the trace counter is greater than zero, decrement the trace counter;
responsive to determining that the trace counter is zero, decrement the discard counter;
responsive to determining that tracing is activated, determine whether the discard counter is greater than zero;
responsive to determining that the discard counter is zero, decrement the trace counter; and
responsive to determining that the discard counter is greater than zero, decrement the discard counter.

8. The trace monitor of claim 6, wherein the plurality of signals further comprises a second set of requests and a second set of responses, and wherein the second set of requests and the second set of responses have a second thread ID, and wherein the trace monitor is further configured to:
track the second set of requests and the second set of responses made before and after tracing is activated to determine which responses of the second set of responses to trace after tracing is activated and which of the remaining responses from the second set of responses to trace after tracing is deactivated.

9. The trace monitor of claim 6, wherein for each request from the set of requests, the tracking further comprises the trace monitor further configured to:
determine whether the request will be traced;
responsive to the request being traced, push an entry into a first-in-first-out list, wherein the entry indicates that the request will be traced; and
responsive to the request being dropped, push an entry into the first-in-first-out list, wherein the entry indicates that the request will be dropped.

10. The trace monitor of claim 6, wherein for each response from the set of responses the tracking further comprises the trace monitor further configured to:
identify a response from the slave device to the master device in the plurality of signals;
determine whether a request associated with the response was traced by reading a next entry in the first-in-first-out list, wherein the next entry indicates whether the response is associated with the request that was traced;
responsive to the determination that the request was dropped, drop the response; and
responsive to the determination that the request was traced, trace the response.

11. Logic encoded in one or more non-transitory computer readable media that includes code for execution and when executed by a processor is operable to perform operations comprising:
tracing an exchange of a plurality of signals between a master device and a slave device of the system on chip, wherein the plurality of signals comprise one or more requests and one or more responses; and
tracking a set of one or more requests and a set of one or more responses made between the master device and the slave device before and after tracing is activated to determine which responses from the set of responses to trace after tracing is activated and which of the remaining responses from the set of responses to trace after tracing is deactivated,
wherein for each request from the set of requests, the tracking further comprises
identifying the request from the master device to the slave device in the plurality of signals,
determining whether tracing is activated when the request is issued, responsive to determining that tracing is deactivated, incrementing a discard counter; and responsive to determining that tracing is activated, incrementing a trace counter, wherein the set of requests and the set of responses have a first thread ID.

12. The method of claim 11, wherein for each response from the set of responses, the tracking further comprises:
identifying a response from the slave device to the master device in the plurality of signals;
determining whether tracing is activated when the response is issued;
responsive to tracing being deactivated, determining whether the trace counter is greater than zero;
responsive to determining that the trace counter is greater than zero, decrementing the trace counter;
responsive to determining that the trace counter is zero, decrementing the discard counter;
responsive to determining that tracing is activated, determining whether the discard counter is greater than zero;
responsive to determining that the discard counter is zero, decrementing the trace counter; and
responsive to determining that the discard counter is greater than zero, decrementing the discard counter.

13. The method of claim 11, wherein the plurality of signals further comprise a second set of requests and a second set of responses, and wherein the second set of requests and the second set of responses have a second thread ID, and wherein the logic further comprises code for execution and when executed by the processor is operable to perform operations comprising:
tracking the second set of requests and the second set of responses made before and after tracing is activated to determine which responses from the second set of responses to trace after tracing is activated and which of the remaining responses from the second set responses to trace after tracing is deactivated.

14. The method of claim 11, wherein for each request from the set of requests, the tracking further comprises:
determining whether the request will be traced;
responsive to determining that the request being traced, pushing an entry into a first-in-first-out list, wherein the entry indicates that the request will be traced; and
responsive to determining that the request being dropped, pushing an entry into the first-in-first-out list, wherein the entry indicates that the request will be dropped.

15. The method of claim 11, wherein for each response from the set of responses, the tracking further comprises:
identifying a response from the slave device to the master device in the plurality of signals;
determining whether a request associated with the response was traced by reading a next entry in the firstin-first-out list, wherein the next entry indicates whether the response is associated with the request that was traced;
responsive to determining that the request is dropped, dropping the response; and
responsive to determining that the request is traced, tracing the response.

* * * * *